United States Patent [19]
Larson et al.

[11] Patent Number: 5,925,714
[45] Date of Patent: Jul. 20, 1999

[54] SURFACTANT FOR SELF-INVERTING POLYACRYLMIDES

[75] Inventors: Eric H. Larson, Freehold; Manilal Dahanayake, Princeton Junction; William R. Busler, Howell, all of N.J.

[73] Assignee: SNF S.A., Saint-Etienne Cedex, France

[21] Appl. No.: 08/206,078

[22] Filed: Mar. 4, 1994

[51] Int. Cl.$^6$ ..................................................... C08F 12/28
[52] U.S. Cl. ........................... 524/827; 524/310; 526/207; 526/310
[58] Field of Search ..................... 524/827, 310; 526/207, 370

[56] References Cited

U.S. PATENT DOCUMENTS

| | | | |
|---|---|---|---|
| 2,982,749 | 5/1961 | Friedrich et al. | 260/23 |
| 3,211,708 | 10/1965 | Zimmerman et al. | 260/78.5 |
| 3,278,506 | 10/1966 | Bookfield et al. | 260/89.7 |
| 3,284,393 | 11/1966 | Vanderhoss et al. | 260/29.6 |
| 3,414,547 | 12/1968 | Thompson et al. | 260/78.5 |
| 3,624,019 | 11/1971 | Anderson et al. | 260/29.6 H |
| 3,734,867 | 5/1973 | Will | 260/2.5 R |
| 3,734,873 | 5/1973 | Anderson et al. | 260/29.6 H |
| 3,767,629 | 10/1973 | Vallino, Jr. et al. | 260/80.3 N |
| 3,826,771 | 7/1974 | Anderson et al. | 260/29.6 H |
| 3,886,067 | 5/1975 | Miranda | 210/680 |
| 3,923,756 | 12/1975 | Svartz | 260/80.3 N |
| 3,957,739 | 5/1976 | Cabestany et al. | 526/207 |
| 3,975,341 | 8/1976 | Trapasso | 526/303 |
| 3,996,180 | 12/1976 | Kane | 260/29.6 H |
| 3,997,492 | 12/1976 | Kane et al. | 260/29.6 WC |
| 4,022,736 | 5/1977 | Schmitt | 260/29.6 E |
| 4,024,097 | 5/1977 | Slovinsky et al. | 260/29.6 N |
| 4,147,681 | 4/1979 | Lim et al. | 260/29.6 TA |
| 4,252,706 | 2/1981 | Phillips et al. | 260/29.6 PM |
| 4,781,819 | 11/1988 | Biresaw et al. | 252/49.5 |
| 4,783,513 | 11/1988 | Cadel et al. | 526/216 |
| 4,915,859 | 4/1990 | Kerr et al. | 252/49.5 |
| 5,258,473 | 11/1993 | Niessener et al. | 522/207 |

*Primary Examiner*—Jeffrey T. Smith
*Attorney, Agent, or Firm*—Paul and Paul

[57] ABSTRACT

Improved water soluble vinyl addition polymers for use as thickening and flocculating agents in water purification treatment, paper manufacture and waste water treatment are prepared using alkoxylated castor oil as an activation release agent. The release agent is biodegradable thereby making the overall product process more environmentally friendly.

9 Claims, 2 Drawing Sheets

SURFACTANT FOR SELF-INVERTING POLYACRYLMIDES

BACKGROUND OF THE INVENTION

A number of synthetic and naturally occurring water soluble polymers have been developed which exhibit, in aqueous solution, superior thickening and flocculating properties. These have proven valuable in a number of commercial applications such as wastewater treatment and water purification, papermaking, petroleum recovery and oil drilling mud stabilizers.

Water treatment polymers such as the above are commercially important in some applications because of their effectiveness in flocculating suspended solids from aqueous systems. Common applications include use in clarification, thickening and filtration unit operations. More specific examples of these applications include clarification of drinking water or water used in coal washing applications, improvement in the retention of solids in papermaking machines, improving the filtration rate of and increasing the sludge cake solids in municipal and industrial waste treatment operations. The mode of action is generally a destabilization of the suspension of solids through coagulation and flocculation mechanisms. The polymer is adsorbed onto the suspended solids which results in a destablization of the suspensions, thereby clumping or aggregating them into a mass large enough to be separated from the solution.

Water treatment emulsion products are dispersions of aqueous solutions of polymers in oil. The finely divided, dispersed internal aqueous phase contains relatively high concentrations of water soluble polymer, often in excess of 50%, as well as a variety of additives such as buffers, chelants, salts and polymerization modifiers such as branching agents and chain transfer agents. These products generally contain one or more surfactants which add substantially to the usefulness of the product by improving stability and handling characteristics. The particle size of the dispersions is normally in the range of 0.1 to 10 $\mu$m, but systems outside of these particle size ranges are certainly feasible.

A key step in the preparation of a product like the above in a water treatment application is the release of the polymer from the oil suspension into the medium being treated. The polymer must make intimate contact with the suspended solids for it to be effective. Since these organic flocculants are relatively expensive, there is a strong economic incentive to develop a product that provides for the greatest efficient use of its polymer content.

When the above product is added to water, a dispersion of oil droplets containing the finely divided particles of water soluble polymer is formed in water. The release of the polymer from this internal aqueous phase to the external aqueous phase is necessary for the polymer to modify the characteristics of the external aqueous phase. This release process is often called "inversion".

The inversion process is subject to much current investigation, and is still not completely understood. First, a dispersion of polymer-containing-oil is added to dilution water and mixed thoroughly. Generally, the next step that is observed is swelling of the internal polymer containing droplets, presumably due to the chemical potential differences between the internal and external aqueous phase (osmotic pressure). Finally, the oil phase will no longer be able to contain the swollen polymer droplets, and a release of polymer into the external aqueous phase will occur.

One technique that has been proven to be of great commercial utility has been the addition of a water soluble surfactant to products like the above after the polymerization has been completed. A variety of such surfactants can be used; one class that has been very successful commercially is the group of products known as alkyl phenol ethoxylates (APE), in particular nonyl phenol ethoxylates with degrees of ethoxylation ranging from 4–15 moles per mole of nonyl phenol.

The inversion step wherein the polymer is released from the internal aqueous phase is improved using a surfactant, sometimes called an activating agent whose activity is dependent upon the dilution water chemistry, temperature, the ionic strength of the polymer and the effects of whatever additives might be present.

U.S. Pat. Nos. 3,624,019 and 3,734,873 to Anderson et. al. teach the basic inversion polymerization technology whereby water soluble vinyl addition polymers are polymerized using a number of surfactants such as ethoxylated alkyl phenols, polyethoxylated vegetable oils and alkyl alcohols and the condensation products of the reaction between a higher fatty alcohol and ethylene oxide. The emulsion is added to excess water to extract the polymers by way of the inversion process.

U.S. Pat. No. 4,147,681 to Lim et. al. teaches a water-in-oil emulsion polymerization process wherein the acrylamide monomers are polymerized through self-inversion using sulfated castor oil. Polyoxyethylene vegetable oil and polyoxyethylene fatty alcohols are disclosed as one of a number of surfactants that bring about the inversion but there is no teaching of the use of a surfactant after polymerization. U.S. Pat. No. 3,997,492 to Kane teaches a stable water-in-oil emulsion of water soluble polymers whereby the surfactant for inversion is selected on the basis of the properties of the organic continuous solvent phase. No specific surfactants are disclosed as particularly useful but are determined on the basis of a mathematical formula, the cohesion energy ratio of the emulsion and the hydrophilic/lipophilic balance (HLB). This adapts the choice of the surfactant to the particular chemical environment or application.

U.S. Pat. No. 4,252,706 to Phillips et. al. teaches a method for precisely controlling the dissolution rate of high molecular weight water soluble vinyl polymers. Again, all the suitable surfactants are not specifically listed but suggested are the non-ionic water soluble surfactants such as nonyl phenol ethoxylates, sorbitan monooleate and the like which are those commonly used in the inversion polymerization process. Finally, U.S. Pat. No. 4,024,097 to Slovinsky et. al. teaches the precipitation of self-inverting polymers in water-in-oil emulsions wherein the surfactant is a fatty amide or alkanolomides such as sodium oleate or Span. There is no disclosure or suggestion of the inversion process of the present invention nor is there the use of castor oil as the activation surfactant.

It is clear then that the process of making water soluble vinyl addition polymers by self-inversion of a water-in-oil polymer containing emulsion is well known in the art and many known surfactants have been found useful as polymerizers in the first step. However, for the most part, only ethoxylated alkyl phenols have been used as activating or release agents since they are inexpensive and generally provide an efficient dissolution of acrylamide polymers in water. However, there has been increasing concern regarding the environmental impact of these compounds, particularly the by-products that result from the biodegradation of these surfactants.

It is an object of the present invention to provide a water soluble vinyl addition polymer with superior thickening and flocculating characteristics that may be released from a standard water-in-oil emulsion using a safe, environmentally friendly activating surfactant. It is a further object of the present invention to provide a method for the self-inversion of a water soluble vinyl addition polymer using a release agent that is both environmentally friendly and provides superior thickening and flocculation properties. It is a further object of the present invention to provide an environmentally safe release agent comprised of an alkoxylated castor oil that enhances the release of the polymer when the water-in-oil emulsion is added to the excess water.

SUMMARY OF THE INVENTION

An improved water soluble vinyl addition polymer is produced by means of a standard oil-in-water emulsion using an environmentally friendly polymer release agent consisting of an alkoxylated castor oil.

DETAILED DESCRIPTION OF THE INVENTION

Figure 1:
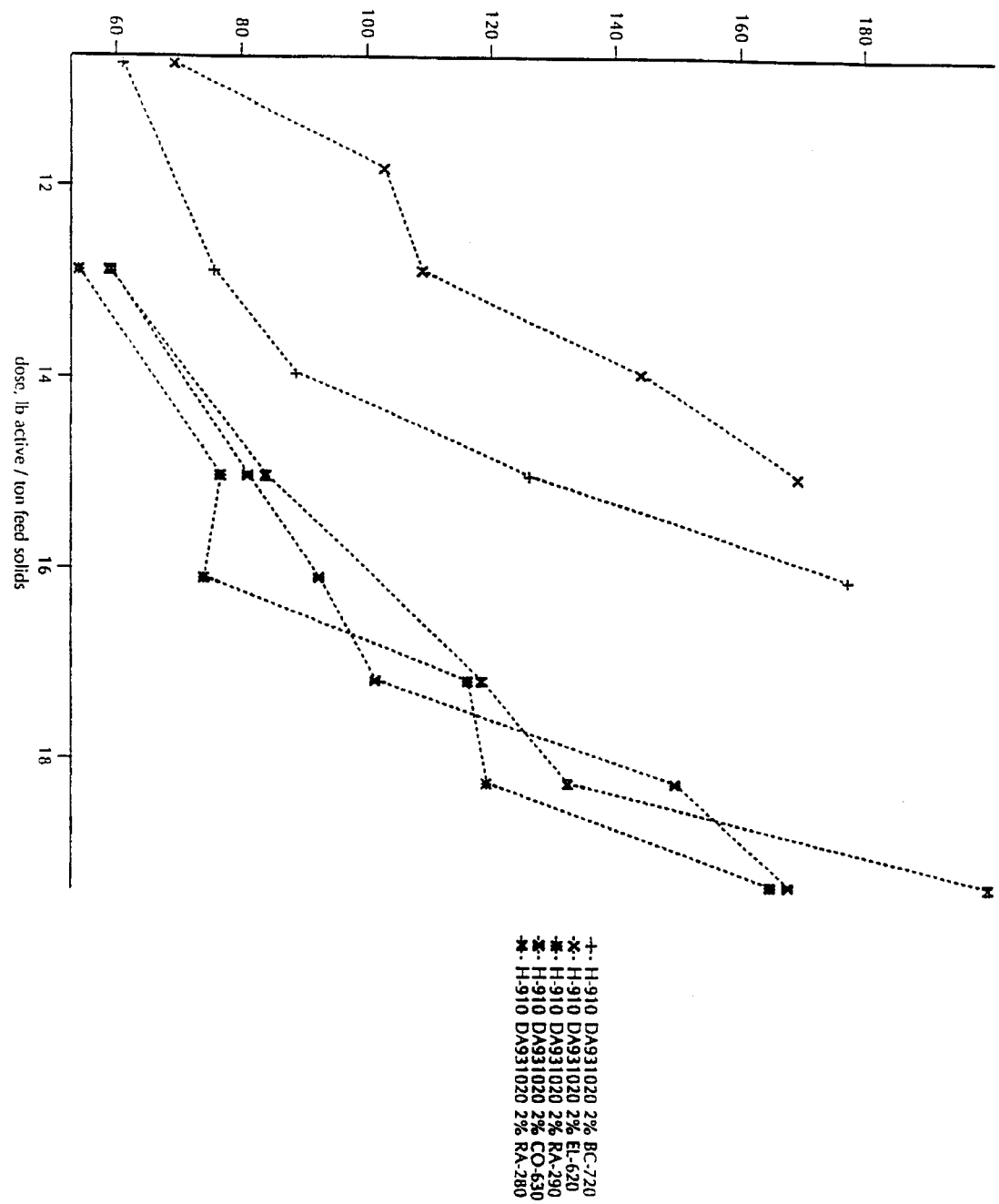
FIG. 1 is a line graph comparing the water treatment efficiency of five polymers released by five different surfactants.

The procedure for the preparation of water soluble vinyl addition polymers is well known in the art as disclosed in U.S. Pat. Nos. 3,624,019 and 3,734,873 which are hereby incorporated by reference. Whereas all the known art uses a surfactant as an initial emulsion stabilizer, the present invention utilizes a partially or totally water soluble surfactant as a release agent to bring the polymer out of the water-in-oil emulsion into the external water phase.

To this end then, after the polymerization reaction is complete in the water-in-oil phase emulsion, alkoxylated castor oil in an amount of approximately 0.5% to about 7.0% by weight of the total weight of the emulsion is either added directly thereto or is added to the excess water to which the emulsion is subsequently combined. In commercial applications, the polymer-containing water-in-oil emulsion and activation surfactant would be combined and shipped to the water treatment site where the excess water is then added and fed into the waste stream at the required rate. In the art, the types and blends of surfactant and levels thereof may be varied to account for variations in the particulars of a given product and process. Of particular value in fact, is a blend of alkoxylated castor oils and other water soluble surfactants.

For example, suitable alkoxylated castor oils useful in the practice of the present invention include, but are not limited to ethoxylated castor oils, propoxylated castor oils and mixtures thereof. Preferably, the alkoxylated castor oil(s) will have approximately 5–50 moles of alkoxylation most preferably, from about 10–40 moles of alkoxylation.

The products of particular interest are emulsion systems produced by chain growth polymerization of dispersions of vinyl monomers. Monomers of particular interest include acrylamide, methacrylamide, acrylic acid and the salts thereof, methacrylic acid and the salts thereof, acrylamidomethylpropane sulfonic acid and the salts thereof, and other vinyl carboxylic or sulfonic acids and their salts, and amine monomers such as methacrylamidopropyltrimethylamine, acrylamidopropyltrimethylamine, acryloyloxyhydroxypropyltrimethylamine, methacryloyloxyhydroxypropyltrimethylamine, acryloyloxyethyltrimethylamine, methacryloyloxyethyltrimethylamine, their salts and quaternary ammonium salts thereof produced with alkylation agents such as alkyl or arylsulfates or halides, and alkylaryl halides such as benzyl chloride.

Other monomers which may be used include materials like diallyldimethylammonium chloride or sulfate, methylenebisacrylamide, diacetone acrylamide, N-alkyl substituted acrylamides, ethylene glycol dimethacrylate, alkoxylated (meth)acrylates and similar vinyl compounds that polymerize with the above monomers.

A wide variety of vinyl monomers may be used in such a process in addition to acrylamide or in place of in varying ratios to control the structure of the resulting polymer. It may be necessary to modify the formulation through varying the ratios of the above ingredients, or changing surfactant types. The wide range of polymer types possible with this technology has made products of this type of great commercial utility in a wide variety of water treatment applications, usually solids-liquids separation processes involving the adsorption of the water soluble polymer on a suspended solid.

The following examples are provided to better describe and more distinctly disclose the manner in which one skilled in the art would go about practicing the present invention. They are for illustrative purposes only and it is realized that minor changes and alternations may be made to the components or process parameters that are not specifically shown. It is to be recognized that to the extent such changes do not dramatically alter the process or product, such changes still fall within the spirit and scope of the claims that follow.

EXAMPLE I

A standard water-in-oil copolymer emulsion was prepared using the following components.

| | |
|---|---|
| Acrylamide (53% solution) | 251.0 gms. |
| DMAEA MC[1] (80% solution) | 50.3 gms. |
| Water | 90.0 gms. |
| HEDTA (40% solution) | 0.05 gms. |
| Citric Acid | 17.3 gms. |
| Potassium Citrate | 5.8 gms. |
| Glycolic Acid | 0.6 gms. |
| Vazo 52[2] | 0.5 gms. |
| Vista LPA 140[3] | 150.0 gms. |
| Ethoxylated lauryl alcohol | 2.6 gms. |
| Sorbitan monooleate | 9.4 gms. |

[1]acryloyloxyethyltrimethyl ammonium chloride
[2]Alkyl substituted azo polymerization initiator (E.I. dupont Co.)
[3]Hydrocarbon solvent (Vista Chemical, Inc.).

In an agitated vessel, the acrylamide and the DMAEA MC were combined by mixing. In a separate agitated, jacketed vessel, the Vista LPA 210, the sorbitan monooleate and the ethoxylated sorbitan monooleated were combined by mixing. The acrylamide-containing solution was slowly added to the jacketed vessel under good mixing conditions. Using a high shear mixer, the average particle diameter of the monomer dispersion was reduced to below 2 μm by homogenization. The jacketed vessel was sealed and purged with an inert gas such as nitrogen until the oxygen content was substantially reduced. The Vazo 52 was then added. The jacketed vessel was maintained at between 45° and 50° by agitating and passing a heat removal liquid such as cold water through the jacket. After 4–8 hours the flow of heat transfer liquid needed to maintain constant temperature was greatly reduced. This indicated that the polymerization is substantially complete.

A variety of water soluble surfactants were added to aliquots of the polymer emulsion prepared above. The specific surfactants were added in an amount of about 2.0% by weight.

1. Castor oil ethoxylate (Alkamuls EL-620).
2. Tridecyl alcohol ethoxylate (Alkamuls BC-720).
3. Propylene oxide/ethylene oxide copolymer (ICI RA-290).
4. Nonyl phenol ethoxylate (Alkasurf CO-630).
5. Propylene oxide/ethylene oxide copolymer (ICI RA-280).

Solutions of these were then prepared by addition to water at the rate of 0.5% by weight of the entire formulation while mixing thoroughly. Dewatering performance of these product variations was then evaluated by addition of aliquots of these solutions to 300 ml samples of Rahway Valley Municipal Waste Water Treatment plant anaerobically digested sewage sludge. This was then mixed by transferring it from one beaker to another and back 10 times, and then was filtered through a Buchner funnel with a filter media of 40 mesh stainless steel cloth. Filtration rates were then recorded by an electronic balance connected by a microcomputer. Plots of the filtration volumes at 20 seconds vs. dose results for each of these surfactants are shown in FIG. 1. As can be seen, the sample containing ethoxylated castor oil yielded the highest filtration volumes thereby indicating the highest degree of flocculation.

EXAMPLE II

A sample of the water-in-oil copolymer emulsion produced in Example I was combined with 2.0% of lauryl alcohol 25 mole ethoxylated (Alkamuls L-25). This surfactant appeared to immediately flocculate the product, resulting in an oil-containing gelatinous mass. Samples of this gelatinous mass were then dissolved in water and filtration rates were measured. Performance was similar to the Alkamuls EL-620, however use of this surfactant was found to be not feasible due to the destabilizing effect on the product emulsion.

EXAMPLE III

Two batches of the water-in-oil copolymer emulsion prepared according to the procedure of Example I were made using the following components.

| | |
|---|---|
| Acrylamide 53% | 175.7 gms. |
| DMAEM MC 80% | 105.88 gms. |
| Water | 112.0 gms. |
| HEDTA 40% | 0.04 gms. |
| Citric Acid | 18.0 gms. |
| NaOH, 50% | 678.0 gms. |
| Glycolic Acid, 70% | 0.6 gms. |
| Vista LPA 170 | 150.0 gms. |
| Ethoxylated lauryl alcohol | 2.6 gms. |
| Sorbitan monooleate | 9.4 gms. |
| Vazo 52 | 0.6 gms. |

The following surfactants and their respective amounts were added to prepare 8 comparative samples.

| | |
|---|---|
| 1. Ethoxylated nonyl phenol (Alkamuls CO-630) | 3.0% |
| 2. Ethoxylated nonyl phenol (Alkamuls CO-630) | 3.0% |
| 3. Ethoxylated castor oil (Alkamuls EL-620) | 2.0% |
| 4. Ethoxylated castor oil (Alkamuls EL-620) | 3.0% |
| 5. Ethoxylated castor oil (Alkamuls EL-719) | 2.0% |
| 6. Ethoxylated castor oil (Alkamuls EL-719) | 3.0% |
| 7. Ethoxylated tridecyl alcohol (Alkamuls BC-720) | 2.0% |
| 8. Ethoxylated tridecyl alcohol (Alkamuls BC-720) | 3.0% |

Drainage rates of sludge samples treated with these products after 5, 15 and 30 minutes were measured according to the procedure of samples 1–5 of Example I. The results were:

| Sample | Performance Index | Percent Inverted in 5 min. | Percent Inverted in 15 min. |
|---|---|---|---|
| 1 | 1.0 | 86 | 90 |
| 2 | 1.0 | 86 | 100 |
| 3 | 0.85 | 88 | 95 |
| 4 | 0.75 | 75 | 100 |
| 5 | 0.96 | 90 | 96 |
| 6 | 1.02 | 88 | 94 |
| 7 | 1.00 | 85 | 93 |
| 8 | 1.10 | 90 | 95 |

Performance index is a measure of the dose ratio of the sample being tested to the dose of sample 1 that is required to obtain equivalent drainage volume results. The lower the value the better the performance. Percentage inverted refers to the dose required to obtain a given drainage result at the give time compared to the drainage results at 30 minutes.

The performance index of sample 4 was clearly superior to the alternatives, and while the percent inverted relative index was lower than the comparatives, the absolute performance at 5 minutes was actually better than the comparatives because of the superior performance of the 30 minute mix sample.

EXAMPLE IV

Figure 2:
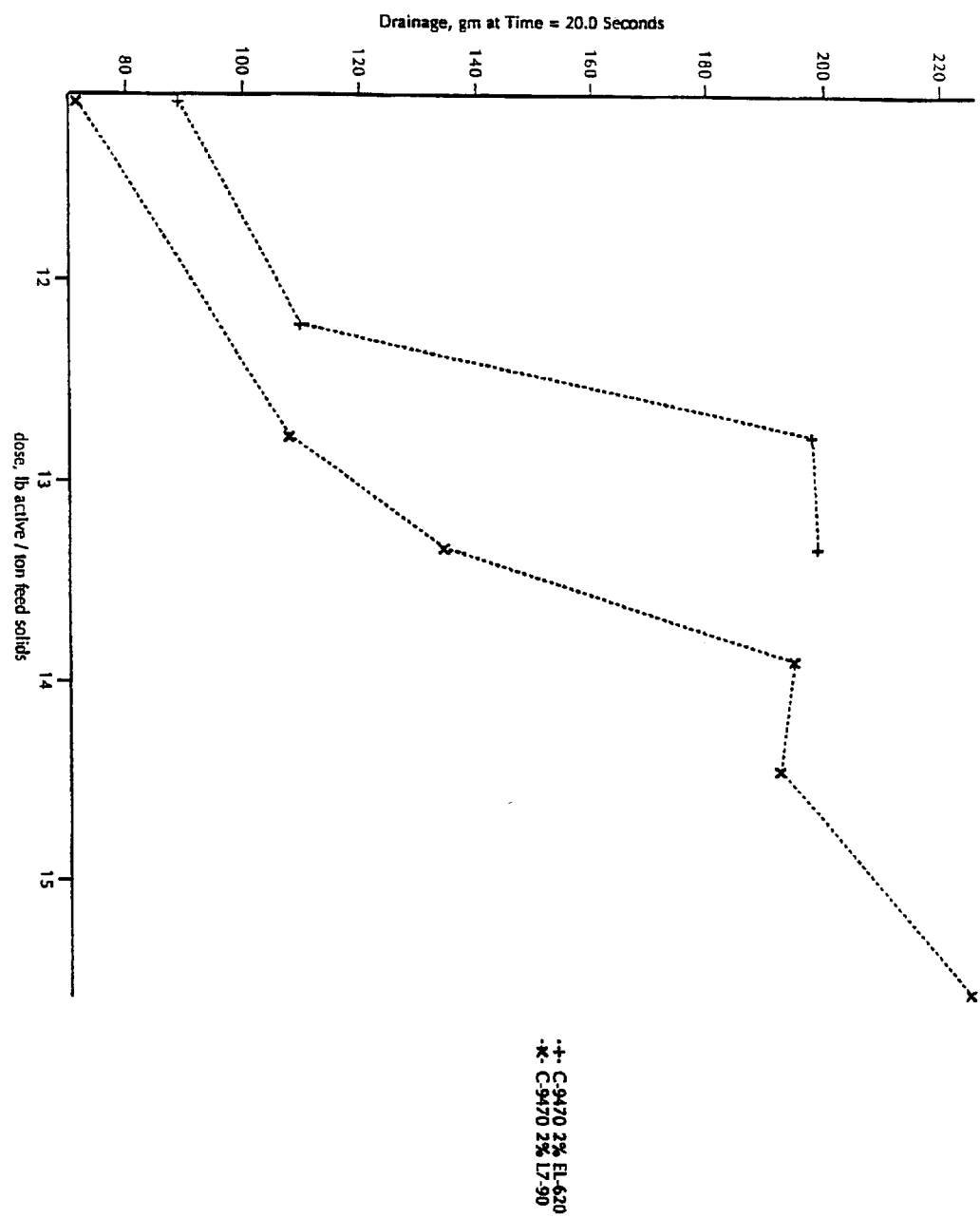
FIG. 2 is a line graph comparing the relative water purification efficiency of a water soluble polymer of the present invention versus one released using a lauryl alcohol surfactant.

Two samples of emulsion product of material produced according to Example III were taken. To one aliquot, 2% of ethoxylated castor oil (Alkamuls EL-620) was added, to the other, 2% of a 7 mole ethoxylate of lauryl alcohol was added. Performance of these samples was measured according to the procedure used for the samples in Example I. Drainage rate curves showing the superior performance of the EL-620 containing sample are shown in FIG. 2.

It is clear then that formulations containing ethoxylated castor oils will have performance advantages over other similar products. While testing has been specific to one mole ratio of this material, there is a great likelihood that variations in degree of ethoxylations, will show a wide range of applications.

EXAMPLE V

In order to demonstrate the effectiveness of various surfactant blends, the following formulation was prepared according to the procedure set forth in Example I.

| | |
|---|---|
| Acrylamidel, 53% solution | 251.0 gms. |
| DMAEA, 80% | 50.3 gms. |
| Water | 90.5 gms. |
| HEDTA, 40% | 0.05 gms. |

-continued

| | |
|---|---|
| Citric Acid | 17.3 gms. |
| Potassium Citrate | 5.8 gms. |
| Glycolic Acid | 0.6 gms. |
| Vazo 52 | 0.5 gms. |
| Vista LPA 140 | 150.0 gms. |
| ethoxylated lauryl alcohol | 2.6 gms. |
| sorbitan monooleate | 9.4 gms. |

This product was divided into four aliquots (1–4); into aliquot 1 was added 2.0% 40 mole ethoxylated castor oil, to aliquot 2 was added 1.0% 40 mole ethoxylated castor oil and 1.0% 5 mole ethoxylated sorbitan monooleate; to aliquot 3 was added 1.0% 40 mole ethoxylated castor oil and 1.0% 9–10 mole ethoxylated tridecyl alcohol, and to aliquot 4 was added 1.0% 40 mole ethoxylated castor oil and 1.0% 15 mole ethoxylated castor oil.

A 0.5% aqueous solution of the resulting product was prepared by addition to water under good mixing conditions, and this was allowed to age for 30 minutes. Twenty-four (24) mls. of the resulting solution was added to 300 mls. aliquots of municipal anaerobically digested sewage sludge, and the resulting mixture was conditioned by pouring back and fourth 10 times in beakers. The conditioned flocculate was filtered through a Buchner funnel with a 40 mesh stainless steel screen filter media. The volume of filtrate was measured and recorded with a electronic microbalance connected to a personal computer.

The series of four aliquots were evaluated under varying conditions; the dilution water temperature was controlled at either 4° C. or left at room temperature (about 21° C.), and either a 4:1 blend of deionized water with tap water or tap water (approximate conductivity 700µ) was used. A total of 24 runs were performed.

The following results for the respective temperatures were as follows:

| Run | Temperature | Water | Aliquot | Filtrate Volume at 20 seconds |
|---|---|---|---|---|
| 1 | Room | Blend | 3 | 110.3 |
| 2 | Room | Tap | 3 | 149.3 |
| 3 | Room | Blend | 1 | 109.8 |
| 4 | 4° C. | Tap | 3 | 38.0 |
| 5 | 4° C. | Blend | 1 | 60.5 |
| 6 | 4° C. | Tap | 1 | 28.0 |
| 7 | 4° C. | Blend | 3 | 65.0 |
| 8 | Room | Tap | 1 | 176.7 |
| 9 | Room | Blend | 2 | 112.5 |
| 10 | 4° C. | Tap | 2 | 27.6 |
| 11 | Room | Tap | 2 | 110.7 |
| 12 | 4° C. | Tap | 1 | 28.0 |
| 13 | Room | Blend | 1 | 109.8 |
| 14 | 4° C. | Blend | 2 | 67.7 |
| 15 | Room | Tap | 1 | 176.6 |
| 16 | 4° C. | Blend | 1 | 60.5 |
| 17 | 4° C. | Blend | 1 | 60.5 |
| 18 | Room | Tap | 1 | 176.5 |
| 19 | 4° C. | Tap | 1 | 28.0 |
| 20 | Room | Tap | 4 | 185.6 |
| 21 | 4° C. | Blend | 4 | 72.0 |
| 22 | Room | Blend | 1 | 109.8 |
| 23 | 4° C. | Tap | 4 | 72.2 |
| 24 | Room | Blend | 4 | 141.4 |

By comparison of the particular experiments such as runs 19 and 21, it is apparent from the above results that there is considerable benefit to the blending of a variety of surfactants with a 40 mole castor ethoxylate to extend the range of effectiveness to a wide range of dilution conditions.

What we claim is:

1. A water soluble vinyl addition polymer prepared by the inversion of a water-in-oil emulsion containing said polymer dispersed therein using a surfactant release agent comprising alkoxylated castor oil;
   wherein said alkoxylated caster oil is selected from the group consisting of
   ethoxylated castor oil, propoxylated castor oil, and mixtures thereof, and
   said polymer is comprised of monomers selected from the group consisting of
   acrylamide, methacrylamide, acrylic acid and the salts thereof, methacrylic acid and the salts thereof, acrylamidomethylpropane sulfonic acid and the salts thereof, and other vinyl carboxylic or sulfonic acids and their salts, and
   amine monomers selected from the group consisting of methacrylamidopropyltrimethylamine, acrylamidopropyltrimethylamine, acryloyloxyhydroxypropyltrimethylamine, methacryloyloxyhydroxypropyltrimethylamine, acryloyloxyethyltrimethylamine, methacryloyloxyethyltrimethylamine and their salts,
   wherein said alkoxylated castor oil has approximately 10–40 moles of alkoxylation and is added to said water-in-oil emulsion in an amount of from about 0.5% to about 7.0% by weight based upon the total weight of the emulsion system.

2. An aqueous solution of a water soluble vinyl addition polymer prepared by the inversion of a water-in-oil emulsion containing said polymer dispersed therein using surfactant release agent comprising alkoxylated castor oil, the aqueous solution comprising the polymer and the release agent;
   wherein said alkoxylated caster oil is selected from the group consisting of
   ethoxylated castor oil, propoxylated castor oil, and mixtures thereof, and
   said polymer is comprised of monomers selected from the group consisting of
   acrylamide, methacrylamide, acrylic acid and the salts thereof, methacrylic acid and the salts thereof, acrylamidomethylpropane sulfonic acid and the salts thereof, and other vinyl carboxylic or sulfonic acids and their salts, and
   amine monomers selected from the group consisting of methacrylamidopropyltrimethylamine, acrylamidopropyltrimethylamine, acryloyloxyhydroxypropyltrimethylamine, methacryloyloxyhydroxypropyltrimethylamine, acryloyloxyethyltrimethylamine, methacryloyloxyethyltrimethylamine and their salts,
   wherein said alkoxylated castor oil has approximately 10–40 moles of alkoxylation and is added to said water-in-oil emulsion in an amount of from about 0.5% to about 7.0% by weight based upon the total weight of the emulsion system.

3. The aqueous solution of the water soluble vinyl addition polymer of claim 2 wherein said surfactant release agent comprises a blend of alkoxylated castor oils and other water soluble surfactants.

4. The water soluble vinyl addition polymer of claim 1 wherein said surfactant release agent comprises a blend of alkoxylated castor oils and other water soluble surfactants.

5. An improved flocculating agent useful in the treatment of waste water and other purification applications comprising a water soluble vinyl addition polymer prepared by the inversion of a water-in-oil-emulsion containing said polymer dispersed therein using a surfactant release agent comprising alkylated castor oil;

wherein said alkylated castor oil is selected from the group consisting of ethoxylated castor oil, propoxylated castor oil, and mixtures thereof, and said polymer is comprised of monomers selected from the group consisting of acrylamide, methacrylamide, acrylic acid and salts thereof, methacrylic acid and the salts thereof, and other vinyl carboxylic or sulfonic acids and their salts, and amine monomers selected from the group consisting of methacrylamidopropyltrimethylamine, acrylamidopropyltrimethylamine, acryloyloxhydroxypropyltrimethylamine, methacryloyloxhydroxypropyltrimethylamine, acryloyloxyethyltrimethylamine, methacryloyloxyethyltrimethylamine and their salts, wherein said alkylated castor oil has approximately 10–40 moles of alkoxylation and is added to said water-in-oil emulsion in an amount of from about 0.5% to about 7.0% by weight based on the total weight of the emulsion system.

6. The improved flocculating agent of claim 5, wherein said surfactant release agent is selected from the group consisting of alkoxylated castor oil.

7. The flocculating agent of claim 6 wherein said alkoxylated castor oil is selected from the group consisting of ethoxylated castor oil, propoxylated castor oil and mixtures thereof.

8. The flocculating agent of claim 7 wherein said alkoxylated castor oil is added to said water-in-oil emulsion in an amount of approximately 0.5% to about 7.0% by weight based on the total weight of the system.

9. The flocculating agent of claim 8 wherein said surfactant release agent comprises a blend of alkoxylated castor oils and other water soluble surfactants.

* * * * *